Patented Oct. 15, 1935

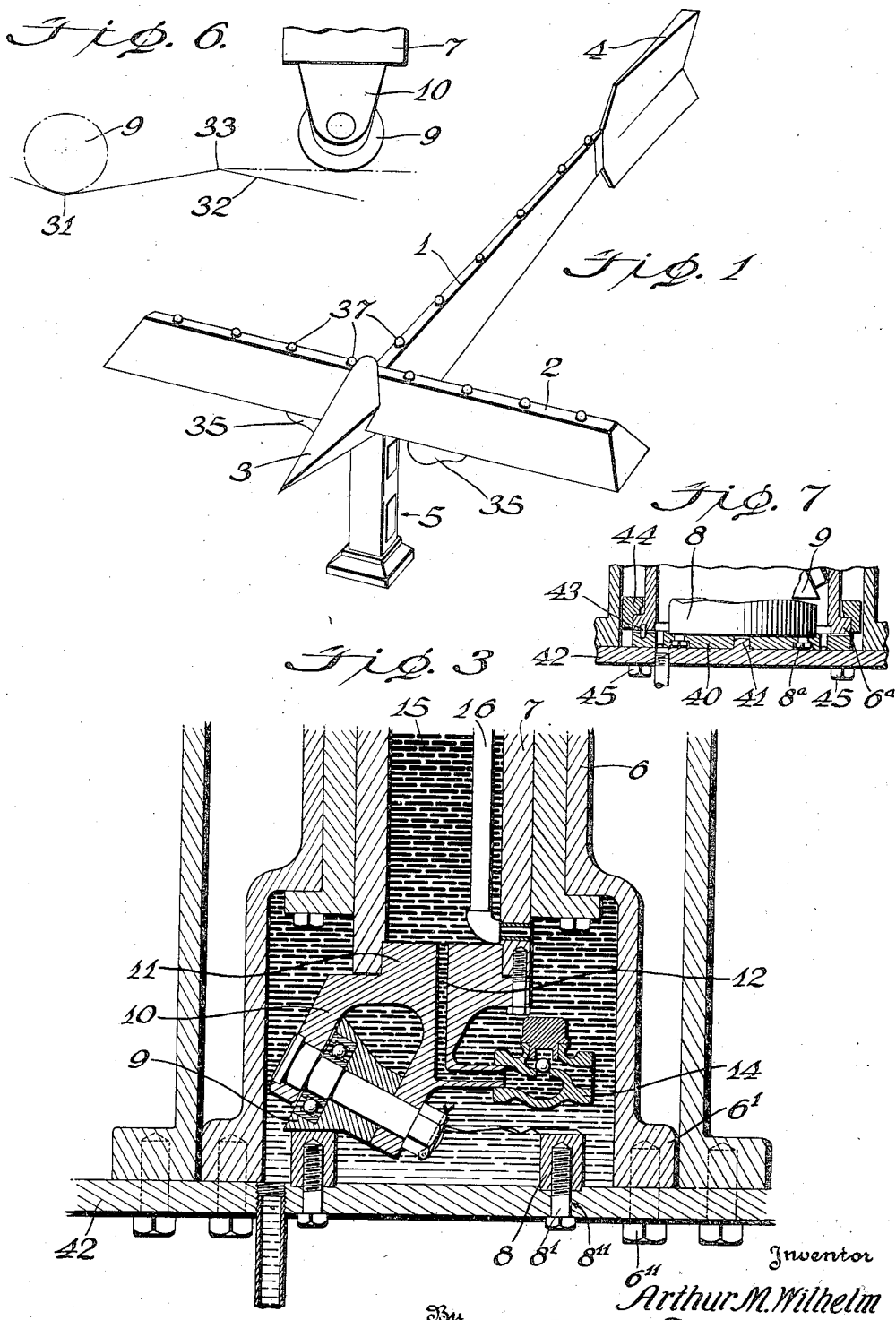

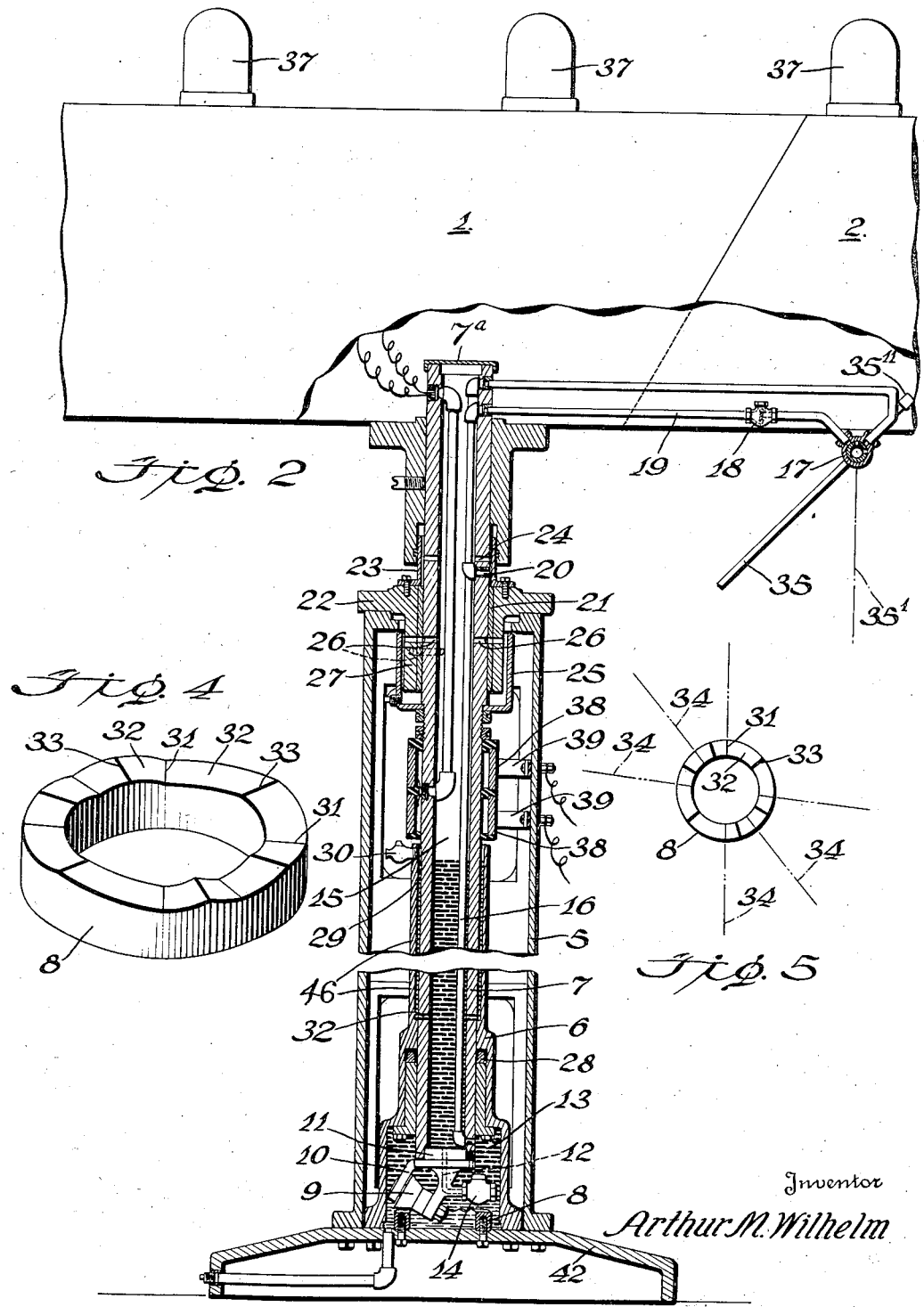

2,017,224

UNITED STATES PATENT OFFICE 2,017,224

WIND T FOR AIRPORTS

Arthur M. Wilhelm, Randolph, N. Y.

Application November 16, 1932, Serial No. 642,947

14 Claims. (Cl. 73—55)

This invention relates to a landing indicator for airports and has particular reference to the means employed for indicating to a flying aviator the direction of the prevailing wind. An object of the present invention is to provide a wind T or indicator which is very sensitive and readily responsive to wind currents so as to be reliable and accurate in its indication. Further, the invention has for its object to provide an indicator which will designate a preferred direction for landing in the prevailing weather.

In the drawings:

Fig. 1 is a perspective of the T embodying the present invention.

Fig. 2 is a vertical section through the T mounting standard, the T body being in fragment and in elevated position.

Fig. 3 is an enlarged vertical section through the lower part of the mounting standard.

Fig. 4 is a detailed perspective of the locating track or member.

Fig. 5 is a diagrammatic view illustrating such locating member in its relation with the various runways of an airport.

Fig. 6 is a diagrammatic view illustrating the floating of the T body on a body of fluid.

Fig. 7 is a fragmentary showing of a slightly modified construction in which the cam track is adjustably mounted.

This invention contemplates the floating of the indicating T on a body of fluid, to eliminate undue friction and resistance to its wind responsive movements, and associated means to insure a predetermined designation when the wind has died down, so that the T will always point out the best or one of the dest directions in which to bring an airplane to ground.

Referring more in particular to the present invention, the numeral 1 designates the T body depicted as having side wings 2 so as to simulate an airplane and at the same time provided with an indicating head 3 and a wind actuated vertical vane or tail 4 the latter having its sides flaring rearwardly so as to more readily catch the wind for responsive action. The T is mounted to freely rotate on a standard 5.

Within the standard is mounted an upright cylinder 6 for containing a fluid, such as oil, and receiving a tubular plunger or spindle 7 for both rotary and longitudinal movement in the cylinder. The lower end of the spindle finds support on a locating track or member 8 and is provided with a follower or traction roller 9 adapted to freely track over the locating member. This roller is journaled in a bracket 10 preferably on an inclined axis and has its track engaging face on a bevel the sides of which, when extended, practically coincide with the center of the circular locating track 8. The bracket 10 may be conveniently carried by a plug or closure 11 which closes the lower end of a reservoir 15 in the spindle 7 and provides a movable wall for the chamber 13. This plunger therefore constitutes a movable wall for the chamber 13 of the cylinder 6, communication between the reservoir and chamber being established through port 12 in which is a check valve 14 to permit outflow of the fluid from the reservoir 15 but prevent retrograde flow from chamber 13. By this arrangement any fluid in the chamber 13 will be trapped therein and will find its escape only through an upflow pipe or conduit 16 thence through a control valve 17, back through a check valve 18 and a return conduit 19 to the reservoir 15.

The locating track or member 8 is provided with one or more rest portions 31 for the roller 9. From each rest portion there extend in opposite directions cam faces 32 of a desired pitch and terminating in the crests or high points 33. The rest portions 31 are preferably disposed in substantial alignment with the landing field runways indicated diagrammatically at 34 in Fig. 5, so that when a contrary wind dies down the roller 9 will return to the adjacent rest or dwell portions of the locating member and remain thereat until motivated up a cam face by a fresh contrary wind.

The locating track or member 8 may be adjustably mounted such as by passing the securing bolts 8' through openings 8" which may be elongated for this purpose; or the locating track may be mounted on an adjustable plate 40 (Fig. 7), said plate being mounted to rotate about an upright stud or pivot 41, the rotating member being anchored to the plate as by securing bolts 8a. The cylinder 6 has its base flange 6' anchored to the base member 42 by anchoring bolts 6", or, as shown in Fig. 7, the base flange 6a will seat directly upon the plate 40 and interlock therewith as by dowel pins 43 so that the cylinder may be turned with the plate 40 to position the rest portions 31 in substantial alignment with the runways of the landing field. To obtain the adjustment in Fig. 7 a clamping ring 44 fits down over the base flange 6a and is clamped in position by securing bolts 45 which are passed through the base plate 42' and threadedly engaged with the clamping ring 44.

As the wind rises and urges the indicating body or T 1 away from such engaged dwell or rest portion of the locating member the roller 9 will ride up the cam or inclined face 32, carrying the hollow spindle 7 with it, or in other words, moving the spindle vertically. This movement of the spindle effects fluid movement from the reservoir 15 past the check valve 14 and into the chamber 13. Such retraction of the plunger or spindle from the chamber 13 will continue as long as the roller 9 moves up an inclined face 32; consequently the chamber 13 will be kept filled with the liquid so that when the roller reaches the adjacent crest 33 the spindle will have been moved vertically to effect the greatest displacement with respect to that particular crest. Therefore, any further rotary movement of the T body under the influence of the wind will merely carry the roller 9 off from the crest in a horizontal plane and out of contact with the locating member, the spindle being supported in its elevated position, and against lowering, by the trapped liquid in the chamber 13. Thus the spindle is supported solely by the trapped body of fluid, or, in other words, is floated, for sensitive response to the wind driven T. Figs. 2 and 6 show the T floated or elevated.

As above stated the faces 32 are preferably of the same pitch. Also the rest stations 31 are preferably in the same horizontal plane so that the crests 33 will be disposed in different horizontal planes where their side faces 32 vary as to length, and therefore if the roller 9 should ride off a low crest and engage a side face of a higher crest it will merely ascend to the latter and effect greater fluid displacement in the chamber 13. Obviously if a sudden gust of wind should reverse the rotation of the T as the roller 9 is ascending one of the cam or side faces 32 said roller will merely float off from the side face, since any movement from a rest station will effect a certain displacement so that the chamber 13 will intake sufficient fluid to fluid support the T if and when the wind moves the T in a manner to carry the roller 9 from the locating track.

This free fluid support of the T will be maintained as long as the wind is of a predetermined velocity sufficient to maintain a release for the trapped fluid inoperative. This wind controlled release will now be described.

Cooperating with the check valve 14 to trap the fluid in the chamber 13 is the valve 17 which is wind controlled. Supported by the indicating member or T is one or more wind actuated members herein illustrated in the form of a paddle or wing 35 adjustably counterbalanced by a weight 35'' to vary their sensitivity to the wind. These wings are movably mounted and connected to the valve for closing the latter upon movement by the wind, such as from the dotted position 35' in Fig. 2 to the full line position illustrated. Normally these wings depend in a substantially perpendicular position as indicated at 35', Fig. 2, and may swing forwardly or backwardly therefrom to close the valve 17. When in the normal, calm weather, position the valve 17 will be opened so that any fluid trapped in the chamber 13 may find escape through the upflow pipe 16, valve 17, check valve 18 and conduit 19, eventually returning to the reservoir 15. The escape of this formerly trapped fluid will permit the indicator body to lower by gravity, or otherwise, and in so lowering the roller 9 will descend the adjacent inclined face 32 and finally come to rest in the nearest dwell portion 31. This coaction between the roller 9 and the locating member 8 will position the indicator to indicate a runway on the landing field extending in a direction indicated by one of the lines 34 (Fig. 5). The check valve 18 serves to enable fluid movement from the chamber 13 to reservoir 15 when valve 17 is open and prevent air entering chamber 13 through the pipes 19 and 16.

Proper lubrication of the spindle in the standard may be effected by having the return flow pipe or conduit 19 discharge through the wall of the spindle, as indicated at 20, so that the oil will flow down the outside of the spindle to lubricate its bearing in the bushing 21 of the standard head 22. Rising from the head 22 is a retaining sleeve 23 encircling the spindle 7 for a distance above the discharge end 20 of said return passage 19. At one or more levels above the discharge 20, the spindle may be provided with drain openings 24 through which the oil, when it rises in the sleeve 23, will overflow therefrom back into the reservoir 15. As the oil passes through the bushing 21 it will be caught by a retaining cup 25 secured to the spindle and extending upwardly a distance thereabout and above the plane of a plurality of other drain openings 26 in the spindle for returning such collected oil back into the reservoir from this level. These drain openings may be disposed at different levels, as indicated, if desired. In order to give proper support to the spindle the head 22 may be provided with a depending sleeve 27 which is shown herein as extending down into the retaining cup 25.

Extending upwardly from the cylinder 6 is a retaining flange 46 encircling the spindle 7 and being preferably spaced therefrom so as to provide a space 29 to catch any oil which may leak past the spindle plunger packing 28. A communicating passage 32 between the reservoir 15 and the space enclosed by the flange 46 provides for the passage of oil from the space back into the reservoir as well as increases the capacity of the reservoir. The level of oil in the reservoir may be determined by the drain valve 30 through which the supply of oil may also be replenished if desired, or such replenishment may be effected by merely removing the dust cap 7a from the top of the spindle and pouring the oil in through the open end thereof.

In practice, the roller 9 will in calm weather rest on the locating track 8, at one of the dwell or rest stations thereof. The release valve 17 will be in open position, with the release vanes 35 in the dotted position indicated at 35', Fig. 2. Now, if a wind should blow up in the identical direction to which the indicator is then pointing, the indicator will remain at rest even though the release vanes will be moved by the wind to close the valve, as shown in full lines in Fig. 2. But if the wind is contrary to the direction of pointing of the T the wind will not only serve to close the release valve 17 but also orient the T to indicate the direction of the wind whereupon the roller 9 will advance on the forward cam face 32 so as to elevate the spindle plunger in the chamber 13 and thereby effect the desired movement of liquid from the reservoir 15 through the check valve 14 into the chamber 13 so that when the roller rides out of contact with the locating track the T body will be supported by the trapped liquid without mechanical friction of parts.

As the spindle is elevated, the pressure in the chamber 13 is obviously reduced so that the fluid from chamber 15 will open the check valve 14 so as to permit the fluid from the reservoir filling the chamber. During this elevation of the spindle the release valve 17 is, of course, closed so that fluid cannot enter the chamber 13 from the pipe 16.

When the wind ceases to blow, or at least dies down below a predetermined velocity, the release vanes 35 will gravitate to their upright position so as to vent the chamber 13 and thereby provide a means of escape for the trapped fluid through the pipe 16, valves 17 and 18 and pipe 19. Upon the release of the fluid from chamber 13 the T will descend to bring the roller 9 into T supporting contact with the locating track and if the point of engagement of the roller with the locating track is elsewhere than at one of the rest or dwell points 31 said roller will descend the adjacent cam face 32 to such rest station and thereby position the T body to indicate one of the several preferred runways at the airport.

For night use the T may be illuminated by electric lights 37 to which the energizing current can be furnished through the collector rings 38 and brushes 39 without interference to the free rotation of the fluid buoyed spindle.

The T is very sensitive to wind currents when it is floated by the fluid in the chamber 13, and by reason of the small pitch to the faces 32 and the large lever advantage offered by the tail vane 4 there is practically very little resistance to the initiating urge of the wind to turn the T sufficiently to float the latter. The spindle-plunger coacts with the chamber 13 to form a pump which is controlled by the wind to float the T for wind responsive movement.

It will be understood that the term "floating" and the like, as used herein and in the appended claims, does not refer to any especial buoyancy of the "floated" member, although such member may be buoyant; but refers to the supporting of such member by the fluid.

What is claimed is:

1. A landing indicator for airports comprising a standard having a chamber, a spindle mounted in the standard for both rotary and axial movements, the lower end of the spindle constituting a wall of the chamber, an indicating member carried by the spindle to move therewith, means acted upon by the wind to rotate the indicating member, a reservoir connected by a passage to the chamber for supplying fluid thereto, a check valve preventing retrograde flow of fluid from the chamber through such passage, means for effecting axial movement of the spindle to displace fluid from the reservoir to the chamber for supporting the spindle and indicating member for such rotary movement, a return passage from the chamber to the reservoir, a release valve in said return passage normally open, and wind responsive means for rendering the release valve inoperative in the presence of a predetermined wind.

2. A landing indicator for airports, comprising a wind rotative indicating member, a fluid receptacle and floatable means therein for supporting said member for rotation, and means operable by and during the initial portion of such wind movement of the indicating member for floating said means by fluid for further wind responsive movement.

3. A landing indicator for airports comprising a fluid chamber having a movable wall, indicating means operatively associated with said wall and having a wind responsive member movable by the wind to indicate the direction thereof, said wind responsive member being operatively connected to said movable wall to influence movement of one by the other, means for moving the wall to chamber enlarging position, means for admitting fluid to and trapping the same in the chamber upon such chamber enlargement whereby to support the wall by the trapped fluid and thereby float said wind responsive member, and means for releasing the trapped fluid to permit inward movement of the wall and the lowering of the wind responsive member.

4. A landing indicator for airports comprising a support having a fluid chamber, a spindle mounted in the support for both axial and rotary movements, the lower end of the spindle acting as a plunger in the chamber, an indicator member connected to the spindle for wind rotative movement, a reservoir connected to the chamber through a passage for supplying fluid to the chamber upon outward axial movement of the plunger, valve means preventing retrograde flow of the fluid through the passage, a return passage from the chamber to the reservoir, a release valve in the return passage normally open, wind responsive means for rendering the release valve inoperative, and means for normally supporting the spindle to hold the indicator member in a predetermined position and operable by and during the initial rotary movement of the indicator member to effect axial movement of the spindle whereby fluid from the reservoir will move to the chamber to support the spindle for further rotative movement.

5. A landing indicator for airports, comprising a wind rotative indicating member, a fluid receptacle and floatable means therein for supporting the member, means for normally urging rotative movement of the member to a predetermined rest position in the absence of a contrary wind and serving to hold said member in such position, and means for fluid floating said supporting means in the presence of a contrary wind whereby the member then may rotate free from the second mentioned means.

6. Indicating means for aviators, comprising a wind rotatable indicator, a fluid receptacle and floatable means therein for supporting the member, means normally associated with said means for holding the indicator at a predetermined designation, said holding means being disengageable from operative association with said floatable means, and wind actuated means for fluid floating the floatable means out of operative association with said holding means to free said indicator for wind responsive movement.

7. Indicating means for airports comprising a support having a fluid chamber, an indicator mounted on the support for both axial and rotary movements, said indicator having a part acting as a plunger in the chamber, a reservoir connected to the chamber through a passage for supplying fluid to the chamber upon outward axial movement of the plunger, said indicator rotated by the wind, valve means preventing retrograde flow of the fluid through the passage, a return passage from the chamber to the reservoir, a release valve in the return passage normally open, wind responsive means for rendering the release valve inoperative, a cam track having a rest portion, an inclined portion and a crest portion, a follower cooperating with the cam track and carried by the spindle to elevate the spindle as the follower moves up the inclined portion of the cam track by and during rotary movement of said indicator and thereby effect fluid displacement from the reservoir to the chamber whereby the fluid in the chamber will support the spindle free of the track as the follower continues its movement from the crest portion.

8. A landing indicator for airports comprising a wind responsive indicator member, means mounting the indicator for rotary movement, said means comprising a chamber having a movable wall supporting said indicator member, a reservoir, means for moving fluid from the reservoir to said chamber for supporting said wall in chamber enlarging position when such enlargement is effected, means for effecting such chamber enlargement by and during wind responsive movement of the indicator member, and wind controlled release means for releasing the fluid from the chamber back to the reservoir.

9. A landing indicator for airports comprising a wind responsive indicating means, a chamber having a wall movable to enlarge the chamber, means supporting the indicating means on said movable wall, said indicating means and movable wall being mounted for rotation by the wind, a reservoir connected to the chamber for supplying fluid thereto upon chamber enlarging movement of the wall and trapping the fluid in the chamber when so transferred thereto, means movable in response to a predetermined wind for moving said wall into chamber enlarging position whereby said wall and indicating means are supported by the fluid in the chamber for rotary movement, and wind controlled release for the trapped fluid permitting the fluid to return to the reservoir.

10. A landing indicator for airports comprising a wind rotatable indicating member, a fluid receptacle and floatable means therein for supporting the member, means for normally urging the member to a predetermined position in the absence of a contrary wind, means for adjusting the urging means, and wind operated means for fluid floating said floatable means to dispose the indicating member free of said second named means.

11. A landing direction indicator comprising a rotatable direction indicating member, a receptacle containing fluid, and means supporting said indicator and journalled for movement about a substantially upright axis, said means extending into said receptacle for support against downward movement by the fluid in said receptacle, other means for supporting the first mentioned means when the fluid level in said receptacle is lowered, and means for lowering the level of fluid in said receptacle.

12. A landing direction indicator comprising a rotatable direction indicating member, a receptacle for containing fluid, means for supporting said indicating member extending into said receptacle and adapted to be supported by fluid in the receptacle, and wind controlled means for causing the first mentioned means to be supported by said fluid in the receptacle at times when the wind is at predetermined velocities.

13. A landing direction indicator comprising a rotatable direction indicating member, a receptacle for containing fluid, means for supporting said indicating member extending into said receptacle and adapted to be supported by fluid in the receptacle, wind controlled means for causing the first mentioned means to be supported by said fluid in the receptacle at times when the wind is at predetermined velocities but causing the first mentioned means not to be supported by said fluid at other times, and other means for supporting said first mentioned means at said other times.

14. A landing direction indicator comprising a wind rotatable direction indicating member, a receptacle containing fluid, means supporting said member and adapted to be supported by fluid in said receptacle whereby said member may assume a position according to the direction of the wind, wind controlled means for causing said first mentioned means to be supported by said fluid when the wind is at predetermined velocities, and means for causing said indicating member to assume a predetermined indicating position at other times.

ARTHUR M. WILHELM.